US010787533B2

(12) United States Patent
Datashvili et al.

(10) Patent No.: US 10,787,533 B2
(45) Date of Patent: Sep. 29, 2020

(54) ONE-POT PROCESS FOR PREPARING LONG-CHAIN BRANCHED POLYOLEFINS

(71) Applicant: BRASKEM AMERICA, INC., Philadelphia, PA (US)

(72) Inventors: Tea Datashvili, Philadelphia, PA (US); Cassandra L. Gallaschun, Philadelphia, PA (US); Sangyoung Shin, Philadelphia, PA (US); Songsheng Zhang, Philadelphia, PA (US)

(73) Assignee: BRASKEM AMERICA, INC., Philadelphia, PA (US)

( * ) Notice: Subject to any disclaimer, the term of this patent is extended or adjusted under 35 U.S.C. 154(b) by 104 days.

(21) Appl. No.: 16/064,368

(22) PCT Filed: Dec. 20, 2016

(86) PCT No.: PCT/US2016/067709
§ 371 (c)(1),
(2) Date: Jun. 20, 2018

(87) PCT Pub. No.: WO2017/112644
PCT Pub. Date: Jun. 29, 2017

(65) Prior Publication Data
US 2019/0002615 A1    Jan. 3, 2019

Related U.S. Application Data

(60) Provisional application No. 62/270,374, filed on Dec. 21, 2015.

(51) Int. Cl.
*C08F 255/04* (2006.01)
*C08F 8/42* (2006.01)
(Continued)

(52) U.S. Cl.
CPC .............. *C08F 255/04* (2013.01); *C08F 8/42* (2013.01); *C08F 8/46* (2013.01); *C08F 8/48* (2013.01);
(Continued)

(58) Field of Classification Search
CPC .. C08F 255/04; C08F 8/42; C08F 8/46; C08F 8/48
(Continued)

(56) References Cited

U.S. PATENT DOCUMENTS 4,690,959 A    9/1987  Plueddemann
5,272,195 A   12/1993  Hagenson et al.
(Continued)

FOREIGN PATENT DOCUMENTS

JP        H01108207 A    4/1989

OTHER PUBLICATIONS

Rzayev (Graft Copolymers of Maisie Anhydride and Its Isostructural Analogues: High Performance Engineering Materials).High Performance Engineering Materials. International Review of Chemical Engineering, vol. 3, No. 2, Mar. 2011, pp. 153-215; p. 155, col. 2, paragraph 2 (Year: 2011).*

(Continued)

*Primary Examiner* — Kelechi C Egwim
(74) *Attorney, Agent, or Firm* — Jeffrey N. Townes; Cozen O'Connor

(57) ABSTRACT

This invention relates to a novel one-pot process for polyolefin modification to form long-chain branched polymers containing polar functional groups, and the long-chain branched polymer resulting from the process. The process comprises reacting the following components (a) through (d) in a one pot process to form a long-chain branched polyolefin. Component (a) is a polyolefin; component (b) includes one or more silane compounds having the formula (Continued)

R"SiR$_n$R'$_{(3-n)}$, component (c) is an ethylenically unsaturated polycarboxylic acid; and component (d) is a free radical initiator. In the formula R"SiR$_n$R'$_{(3-n)}$ for component (b), R" is an ethylenically or acetylenically unsaturated radical; R is a hydrolyzable group selected from the group consisting of an alkoxy, acyloxy, alkylamino, and arylamino; R' is a hydrocarbyl group having 1 to 6 carbon atoms; and n is 1, 2, or 3.

20 Claims, 2 Drawing Sheets

(51) Int. Cl.
C08F 8/46 (2006.01)
C08F 8/48 (2006.01)
C08L 19/00 (2006.01)
C08K 5/14 (2006.01)
C08K 7/14 (2006.01)
C08J 3/24 (2006.01)
C08L 23/12 (2006.01)
C08F 255/02 (2006.01)
C08K 3/36 (2006.01)

(52) U.S. Cl.
CPC ............. *C08F 255/02* (2013.01); *C08J 3/247* (2013.01); *C08K 3/36* (2013.01); *C08K 5/14* (2013.01); *C08K 7/14* (2013.01); *C08L 19/00* (2013.01); *C08L 23/12* (2013.01); *C08F 2810/10* (2013.01); *C08F 2810/20* (2013.01); *C08J 2323/12* (2013.01); *C08L 2205/16* (2013.01)

(58) Field of Classification Search
USPC ........................................................ 524/559
See application file for complete search history.

(56) References Cited

U.S. PATENT DOCUMENTS

| | | | |
|---|---|---|---|
| 8,063,148 B2* | 11/2011 | Gahleitner | C08J 3/005 525/191 |
| 2004/0116602 A1 | 6/2004 | Botros | |
| 2007/0104966 A1 | 5/2007 | Calvez et al. | |
| 2011/0172368 A1* | 7/2011 | Stolz-Dunn | C08F 255/00 525/279 |
| 2013/0059989 A1* | 3/2013 | Ansems | B32B 27/08 525/92 C |
| 2013/0216750 A1 | 8/2013 | Li et al. | |

OTHER PUBLICATIONS

Bengtsson et al., "Silane crosslinked wood plastic composites: processing and properties," Composites Science and Technology 66: 2177-2186 (2006).

Monasterio et al., "Effect of the organic groups of difunctional silanes on the preparation of coated clays for olefin polymer modification," Clay Minerals 45: 489-502 (2010).

Rzayev, "Graft Copolymers of Maleic Anhydride and Its Isostructural Analogues: High Performance Engineering Materials," International Review of Chemical Engineering Materials 3: 153-215 (2011).

* cited by examiner

ONE-POT PROCESS FOR PREPARING LONG-CHAIN BRANCHED POLYOLEFINS

CROSS-REFERENCE TO RELATED APPLICATIONS

This application is a national-stage application of International PCT Application No. PCT/US2016/067709, filed Dec. 20, 2016, which claims the benefit of priority to U.S. Provisional patent application Ser. No. 62/270,374, filed Dec. 21, 2015, both of which are hereby incorporated by reference in their entirety.

FIELD OF THE INVENTION

This invention relates to a novel one-pot process for modifying polyolefins with silane compounds and an ethylenically unsaturated polycarboxylic acid to form long-chain branched polymers, and the long-chain branched polymers resulting from the process.

BACKGROUND OF THE INVENTION

Polyolefin-based materials have gained wide commercial acceptance and usage in numerous applications because of the relatively low cost of the polymers and the desirable properties they exhibit, such as chemical resistance, water resistance, and heat resistance.

However, polyolefins are non-polar and do not contain reactive functional groups on the surface, making it difficult to further processing, e.g., to attain painting or adhesion on polyolefin molded bodies or films. Moreover, many polyolefins have a highly linear structure, a relatively low melt strength, and relatively low extensional performance and, thus, have limited applications in processes such as thermoforming, foaming, blow molding, film molding, and extrusion coating. Polymers containing long-chain branches and/or polar functional groups, on the other hand, have great value in processing techniques that demand high polarity and/or high melt strength. Thus, research effort has been spent on modifications of polyolefin properties to introduce polar groups or improve melt strength.

Polyolefin grafting modifications have been carried out to improve properties of polyolefin-based materials and expand their uses. One way of modification is grafting silicon-containing materials (e.g., silicones, reactive silanes, siloxanes, and silicates) with polyolefins to form siloxane-modified polyolefin copolymers. Silicones (polysiloxanes) are polymers containing a hybrid of inorganic and organic compounds and containing silicon and oxygen atoms in the main polymer chains and organic substituents bound to silicon atoms. Silicones are useful in applications such as silicone oils, rubbers because of their thermostability, chemical stability, low surface energy, and lubricating properties. Grafting polyolefins with silicones provides a combination of favorable characteristics of both polysiloxanes and polyolefins. Silanes have also been used to be grafted to polypropylene. The reactive group in a silane can be grafted on the polypropylene chains during the extrusion process, and the subsequent alcoholysis and dehydration of the grafted silane can be induced by water to form Si—O—Si bonds between polypropylene chains. However, the processes and technology involved in polyolefin modifications with silanes are complicated and costly because the processes use at least two steps: grafting and subsequent crosslinking (and curing).

There thus remains a need in the art to develop a new process to more efficiently modify polyolefins with silanes to provide high polarity and high melt strength in a cost-effective way. This invention answers that need.

SUMMARY OF THE INVENTION

One aspect of the invention relates to a process for forming a long-chain branched polyolefin. The process comprises reacting the following components (a) through (d) in a one-pot process to form a long-chain branched polyolefin. Component (a) is a polyolefin; component (b) includes one or more silane compounds having the formula $R''SiR_nR'_{(3-n)}$ (I), component (c) is an ethylenically unsaturated polycarboxylic acid; and component (d) is a free radical initiator. In formula (I), R" is an ethylenically or acetylenically unsaturated radical; R is a hydrolyzable group selected from the group consisting of an alkoxy, acyloxy, alkylamino, and arylamino; R' is a hydrocarbyl group having 1 to 6 carbon atoms; and n is 1, 2, or 3.

Another aspect of the invention relates to a blend composition comprising at least two components. The first component comprises: (a) a polyolefin, (b) one or more silane compounds having the formula $R''SiR_nR'_{(3-n)}$ (I); and (c) an ethylenically unsaturated polycarboxylic acid. In formula (I), R" is an ethylenically or acetylenically unsaturated radical; R is a hydrolyzable group selected from the group consisting of an alkoxy, acyloxy, alkylamino, and arylamino; R' is a hydrocarbyl group having 1 to 6 carbon atoms; and n is 1, 2, or 3. The second component comprises: (d) a free radical initiator. The first and second components may be separately packed and are readily admixable.

Another aspect of the invention relates to a long-chain branched polyolefin comprising (a) one or more silane compounds covalently bonded at one or more binding sites along the polyolefin chain; and (b) one or more ethylenically unsaturated polycarboxylic acids covalently bonded at one or more binding sites along the polyolefin chain.

DETAILED DESCRIPTION OF THE INVENTION

Figure 1:
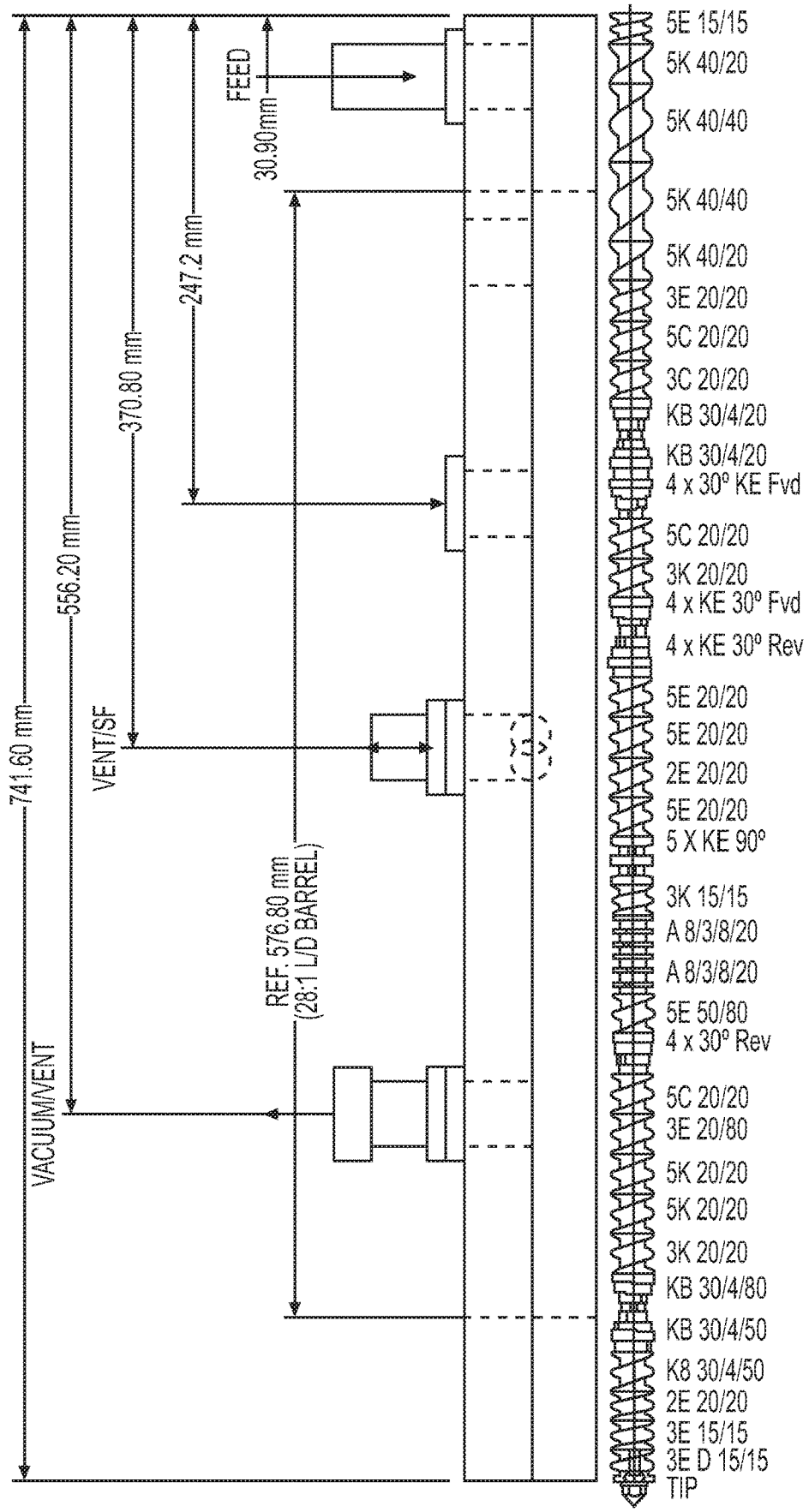
FIG. 1 is a scheme showing the screw configuration of the 21-mm co-rotating twin extruder for the extrusion process.

This invention relates to a novel one-pot process to modify polyolefins to introduce branches and polar functional groups into polyolefins. The process involves reacting the polyolefin, one or more silane compounds, an ethylenically unsaturated polycarboxylic acid such as itaconic acid, and a free radical initiator in a one-pot reactor, thereby eliminating the cost and time spent on lengthy separations and purifications of the intermediate compounds, while increasing the yield of the product. The resulting long-chain branched polymers not only provide an increased degree of branching to achieve a high melt strength, but, at the same time, provide an improved polarity. Accordingly, the long-chain branched polymers prepared by this process are useful in a wide range of applications that call for polymers having a high melt strength and/or high polarity.

One aspect of the invention relates to a process for forming a long-chain branched polyolefin. The process comprises reacting the following components (a) through (d) in a one-pot process to form a long-chain branched polyolefin. Component (a) is a polyolefin; component (b) includes one or more silane compounds having the formula $R''SiR_nR'_{(3-n)}$ (I), component (c) is an ethylenically unsaturated polycarboxylic acid; and component (d) is a free radical initiator. In formula (I), R" is an ethylenically or acetylenically unsaturated radical; R is a hydrolyzable group selected from the group consisting of an alkoxy, acyloxy, alkylamino, and arylamino; R' is a hydrocarbyl group having 1 to 6 carbon atoms; and n is 1, 2, or 3.

The process may further comprise the step of mixing one or more of component (a), (b), (c), and (d) with silicon dioxide, prior to the reacting step.

Component (a)

The process may be used to modify any polyolefin. Suitable polyolefins include those prepared from linear or branched olefins having 2 to 20 carbon atoms, 2 to 16 carbon atoms, or 2 to 12 carbon atoms. Typically, the olefin used to prepare the polyolefin is α-olefin. Exemplary linear or branched α-olefins includes, but are not limited to, ethylene, propylene, 1-butene, 2-butene, 1-pentene, 3-methyl-1-butene, 4-methyl-1-pentene, 3-methyl-1-pentene, 1-hexene, 3,5,5-trimethyl-1-hexene, 4,6-dimethyl-1-heptene, 1-octene, 1-decene, 1-undecene, 1-dodecene, 1-tetradecene, 1-hexadecene, 1-octadecene, and 1-eicocene. These olefins may contain one or more heteroatoms such as an oxygen, nitrogen, or silicon.

The term "polyolefin" generally embraces a homopolymer prepared from a single type of olefin monomer as well as a copolymer prepared from two or more olefin monomers. A specific polyolefin referred to herein shall mean polymers comprising greater than 50% by weight of units derived from that specific olefin monomer, including homopolymers of that specific olefin or copolymers containing units derived from that specific olefin monomer and one or more other types of olefin comonomers. For instance, polypropylene shall mean polymers comprising greater than 50 wt % of units derived from propylene monomer, including polypropylene homopolymers or copolymers containing units derived from propylene monomer and one or more other types of olefin comonomers. The polyolefin used herein can be a copolymer wherein the comonomer(s) is/are randomly distributed along the polymer chain, a periodic copolymer, an alternating copolymer, or a block copolymer comprising two or more homopolymer blocks linked by covalent bonds.

Typical polyolefins include polyethylene, polypropylene, a copolymer of polyethylene and polypropylene, and a polymer blend containing polyethylene, polypropylene, and/or a copolymer of polyethylene and polypropylene. In certain enbodiments, the polyolefin is polypropylene or polyethylene.

The polyolefin can also be an impact copolymer, i.e., a heterophasic polyolefin copolymer where one polyolefin is the continuous phase and an elastomeric phase is uniformly dispersed therein. This would include, for instance, a heterophasic polypropylene copolymer where polypropylene is the continuous phase and an elastomeric phase is uniformly dispersed therein. The impact copolymer results from an in-reactor process rather than physical blending. A polypropylene impact copolymer may contain ethylene comonomer at the amount of at least 5 wt %, or at least 10 wt %; and up to 40 wt %, up to 35 wt %, up to 25 wt %, up to 20 wt %, or up to 15 wt %. Examples of some suitable impact polypropylene copolymers may be found in U.S. Pat. No. 6,593,005, which is incorporated herein by reference in its entirety.

The polyolefin can also be a polymer blend containing ethylene propylene rubber (EPR). The term "blend" or "polymer blend" generally refers to a mixture of two or more polymers. Such a blend may or may not be miscible, and may or may not be phase separated. A polymer blend may or may not contain one or more domain configurations, as determined from transmission electron spectroscopy, light scattering, x-ray scattering, or other methods known in the art.

Component (b)

One or more silane compounds are used to modify the polyolefin. The silane compound may be unsaturated, having a formula of $R''SiR_nR'_{(3-n)}$ (I).

In formula (I), R" is an ethylenically or acetylenically unsaturated radical that enables the silane compound to bond with the polyolefin. "Ethylenically unsaturated radical" refers to an unsaturated radical containing one or more ethylene bonds (C=C). "Acetylenically unsaturated radical" refers to an unsaturated radical containing one or more acethylene bonds (C≡C). For the purpose of this application, ethylenically or acetylenically unsaturated radicals can be cyclic unsaturated radicals containing one or more ethylene bonds (C=C) and acethylene bonds (C≡C), e.g., cyclohexane and cyclohexyne.

For instance, R" can have the structure of

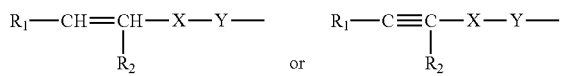

For each structure, $R_1$ and $R_2$ each are independently H, $C_1$-$C_6$ alkyl, or $C_5$-$C_{16}$ aryl; or, alternatively, $R_1$ and $R_2$ together form a cyclic hydrocarbyl. X is absent or an electron withdrawing linkage, such as —C(=O)—O— or —C(=O)—NH—. Y is absent, or a divalent moiety, such as an alkylene, an arylene, or a polyether chain. Y can be a $C_1$-$C_6$ alkylene. Alternatively, Y can be a $C_5$-$C_{16}$ arylene, such as phenalene or naphthalene. Y can also be a polyether chain, e.g., polyethylene glycol or polypropylene glycol.

In an exemplary embodiment, R" can have the structure of

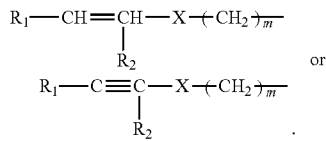

wherein $R_1$ and $R_2$ each are independently H or $C_1$-$C_6$ alkyl, or, alternatively, $R_1$ and $R_2$ together form a cyclic hydrocarbyl; X is absent, —C(=O)—O—, or —C(=O)—NH—; and m is 0-6.

Exemplary R" groups are vinyl, allyl, isopropenyl, butenyl, cyclohexanyl, acryloxymethyl, acryloxypropyl, (meth)acryloxy methyl, (meth)acryloxy propyl, and styryl.

Each R in formula (I) is a hydrolyzable group selected from the group consisting of an alkoxy, acyloxy, alkylamino, and arylamino. The alkoxy groups generally each have a linear or branched $C_1$-$C_6$ alkyl chain. Exemplary R groups are methoxy, ethoxy, formyloxy, acetoxy, and propionyloxy. Typically, R is a methoxy or ethoxy.

R' in formula (I) is a hydrocarbyl group having 1 to 10 carbon atoms. R' may be absent when n is 3. Exemplary R' groups are methyl, ethyl, propyl, butyl, pentyl, hexyl, octyl, decyl, and phenyl. Typically, R' is a methyl or ethyl.

n is 1-3. As long as the silane compound contains hydrolyzable groups connected to the Si atom, the silane compound can undergo hydrolysis, condensation, and crosslinking reactions. When n is 3 the silane compound contains the maximum numbers of hydrolyzable and/or crosslinking sites.

Exemplary siliane compounds include vinyltrimethoxysilane, vinyl triethoxysilane, 3-(trimethoxysilyl)propyl methacrylate, 3-(triethoxysilyl)propyl methacrylate, trimethoxysilyl propyl acrylate, trimethoxysilyl methyl acrylate, [dimethoxy(methyl)silyl]propyl acrylate, 3-[methoxy(dimethyl)silyl]propyl acrylate, methoxy(dimethyl)silyl]methyl acrylate, vinyl triacetoxysilane, p-styryltrimethoxysilane, and combinations thereof. For instance, the siliane compound may be 3-(trimethoxysilyl)propyl methacrylate

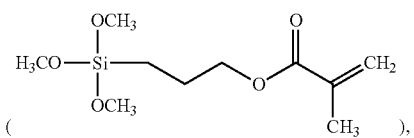 [SMILES: C=C(C)C(=O)OCCC[Si](OC)(OC)OC]

vinyltrimethoxysilane

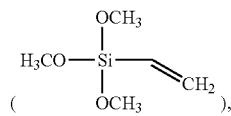

or a mixture thereof.

The silane compound may be added to the reaction at the same time as the polyolefin. The silane compound can be added in an amount ranging from 0.05 to 10 wt % relative to the amount of the polyolefin, for instance, from 0.05 to 3.0 wt %, from 0.05 to 2.0 wt %, or from 1.0 to 2.0 wt % relative to the amount of the polyolefin.

Component (c)

An ethylenically unsaturated polycarboxylic acid is added in the process to introduce branches along the polyolefin chain. The term "polycarboxylic acid" refers to a compound containing two or more carboxyl functional groups (—COOH). Any unsaturated polycarboxylic acid capable of a dehydration reaction to release water may be suitable for this process. As discussed below in the reaction mechanism, the unsaturated polycarboxylic acid, after being grafted onto the polyolefin, can release water via a dehydration process. The released water, in turn, can then be used for the hydrolysis of the silane compound. As an example, itaconic acid can be grafted onto the polyolefin, and undergo a dehydration process to release water, as show below:

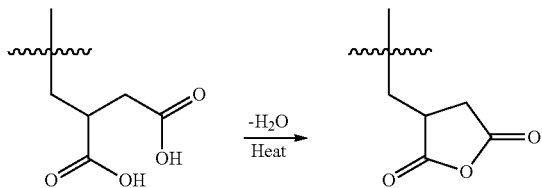

Exemplary polycarboxylic acids are itaconic acid, maleic acid, fumaric acid, glutaconic acid, muconic acid, glutinic acid, citraconic acid, and mesaconic acid. A typical ethylenically unsaturated polycarboxylic acid used in the reaction is itaconic acid.

The ethylenically unsaturated polycarboxylic acid may be added to the reaction at the same time as the polyolefin and silane compound. The ethylenically unsaturated polycarboxylic acid can be added in an amount ranging from 0.05 to 5 wt % relative to the amount of the polyolefin, for instance, from 0.05 to 2.0 wt %, from 0.1 to 2.0 wt %, or from 0.05 to 1.0 wt % relative to the amount of the polyolefin.

Component (d)

A free radical initiator is used to initiate the polymerization reaction. A typical free radical initiator is a peroxide. Other suitable free radical initiators may be found in U.S. Pat. No. 3,646,155, which is incorporated herein by reference in its entirety. Suitable peroxides, for use as the free radical initiator, include, but are not limited to, a diacyl peroxide, such as benzoyl peroxide and dimyristoyl peroxide; a peroxyester such as tert-butylperoxy benzoate, tert-butylperoxy acetate, and O,O-tert-butyl-O-(2-ethylhexyl) monoperoxy carbonate; a peroxyketal, such as n-butyl-4,4-di-(tert-butyl peroxy) valerate; a dialkyl peroxide such as 1,1-bis(tertbutylperoxy)cyclohexane, 1,1-bis(tert-butylperoxy)-3,3,5-trimethylcyclohexane, 2,2-bis(tert-butylperoxy) butane, dicumylperoxide, tert-butylcumylperoxide, di-(2-tert-butylperoxy-isopropyl-(2))benzene, di-tert-butylperoxide (DTBP), 2,5-dimethyl-2,5-di(tert-butylperoxy)hexane, 2,5-dimethyl-2,5-di (tert-butylperoxy) hexyne, and 3,3,5,7,7-pentamethyl 1,2,4-trioxepane; an organic peroxycarbonate or organic peroxydicarbonate such as dimyristyl peroxydicarbonate, dicetyl peroxydicarbonate, tert-butylperoxy 2-ethylhexyl carbonate, di(2-ethylhexyl) peroxydicarbonate, and tert-butylperoxy isopropyl carbonate; and combinations thereof. A typical peroxide used in the reaction is a dialkyl peroxide, e.g., 2,5-dimethyl-2,5-di (tert-butylperoxy)hexane.

The free-radical initiator may be added at the same time as the polyolefin, ethylenically unsaturated polycarboxylic acid, and silane compound. The free-radical initiator can be added in an amount of from 0.01 to 2.0 wt % of the polyolefin, for instance, from 0.01 to 1.0 wt %, from 0.01 to 0.5 wt %, from 0.05 to 2.0 wt %, from 0.05 to 1.0 wt %, from 0.05 to 0.5 wt %, or from 0.1 to 0.5 wt % of the polyolefin.

Component (e)

Optionally, silicon dioxide (i.e., silica) is added to the reacting step. Silica is used as a process aid and can be mixed with one or more of components (a), (b), (c), and (d), prior to the reacting step. Mixing the reactants with silica can help with "stickiness" issues sometimes seen in polymer powders or granules. Adding silica can help the polymer become free-flowing. This is especially useful when the power or granule reactant is stored for long periods of time at elevated pressure and temperature. For liquid polymer or other reactants, mixing with silica can help the liquid polymer or reactants homogeneously distribute into solid mixtures or melts. Accordingly, adding silica in the reacting step or prior to the reacting step helps render free flowing and more homogenous reactants that are easy to handle when being conveyed and fed into the processing procedures, such as compounding, extrusion, injection molding and sintering processes.

Suitable silica includes both amorphous and crystalline silica having a partilcle size of less than 500 μm. Typically, fumed silica is used with a particle size ranging from 1 to 500 μm. Silica is used in the process as an excipient (lubricant) to improve process characteristics, mainly to disperse various components during melt-mixing.

In an exemplary process, the reactants include a polypropylene homopolymer as the polyolefin component, a mixture of

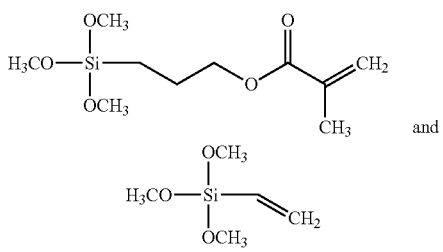

as the silane compound component,

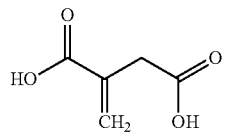

as the ethylenically unsaturated polycarboxylic acid component, and

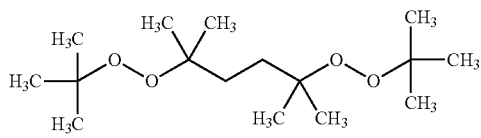

as the free radical initiator component. These reactants are fed into extrusion process simultaneously to enable the reaction. Fumed silica is used as the process aid, which is mixed with one or more components prior to or during feeding to the processing procedures.

Inorganic Material Component

The process of the invention can further comprise the step of adding an inorganic material during the reaction of component (a) through component (d). Any inorganic material can be used. Suitable inorganic materials include, but are not limited to, glass fibers, inorganic fibers, functionalized silica nanoparticles, polyhedral oligomeric silsesquioxane (POSS), functionalized carbon nanotubes, clay, and combinations thereof.

The One Pot Process:

In one embodiment, the procees is a one-pot process. The silane compounds and ethylenically unsaturated polycarboxylic acids are grafted onto the polyolefin chains via free radical reactions, using the unsaturated (reactive) groups of the silane compounds and ethylenically unsaturated polycarboxylic acids, with everything taking place in a single reaction vessel.

A few reactions can occur in this one-pot process. Ethylenically unsaturated polycarboxylic acids are grafted onto the polyolefin, i.e., one or more ethylenically unsaturated polycarboxylic acids are covalently bonded at one or more binding sites along the polyolefin chain; the carboxylic acid groups of the ethylenically unsaturated polycarboxylic acids go through a dehydration reaction, forming a cyclic acid anhydride structure and producing water; one or more silane compounds are hydrolyzed in the presence of the water produced by the dehydrating the carboxylic acid groups of the ethylenically unsaturated polycarboxylic acids; the hydrolyzed one or more silane compounds are condensated; and one or more condensated silane compounds are covalently bonded at one or more binding sites along the polyolefin chain. Further reactions can also take place between the silane compound and/or ethylenically unsaturated polycarboxylic acid-modified polyolefin, as well as between the remaining condensated silane compounds, itaconic acid, and polyolefins.

An exemplary one-pot process mechanism is shown in Scheme 1 and Scheme 2, in which polypropylene is grafted with a vinylalkylenetrimethoxysilane and itaconic acid, using a peroxide as the free radical initiator.

As illustrated in Scheme 1, the free radical polymerization reaction starts with initiation. Initiation is accomplished by adding a free radical initiator capable of decomposing to form free radicals. The decomposed free radical fragment of the initiator attacks polypropylene yielding a polyolefin macroradicals, which can then react with itaconic acid, thus grafting itaconic acid onto the polypropylene chain as the branches. Grafted itaconic acid releases water via a dehydration process that is used to hydrolyze the silane compound. Also, the acidic nature of itaconic acid acts as a catalyst and promotes the hydrolysis process. The silane compound is hydrolyzed and subsequently undergoes a condensation reaction.

Scheme 1. Reaction mechanism illustrated for the macroradical formation, the grafting of itaconic acid onto polyolefin, and the hydrolysis and condensation of the silane compound.

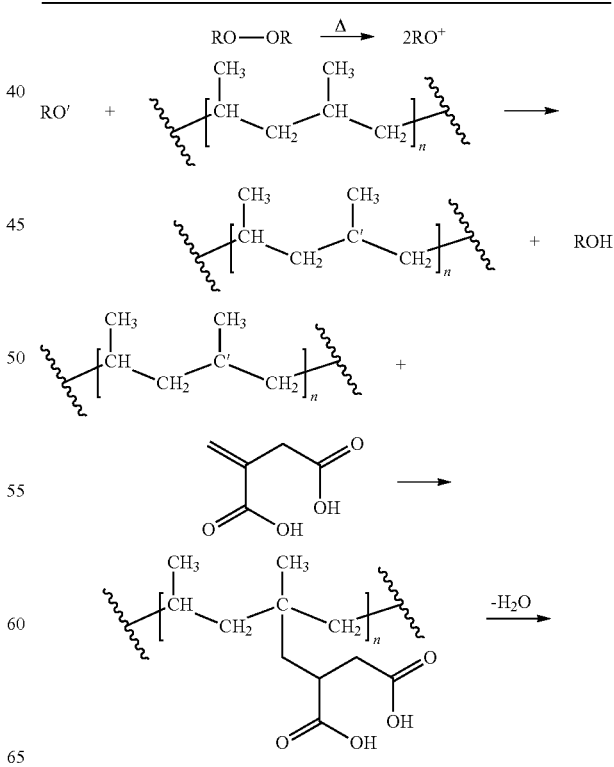

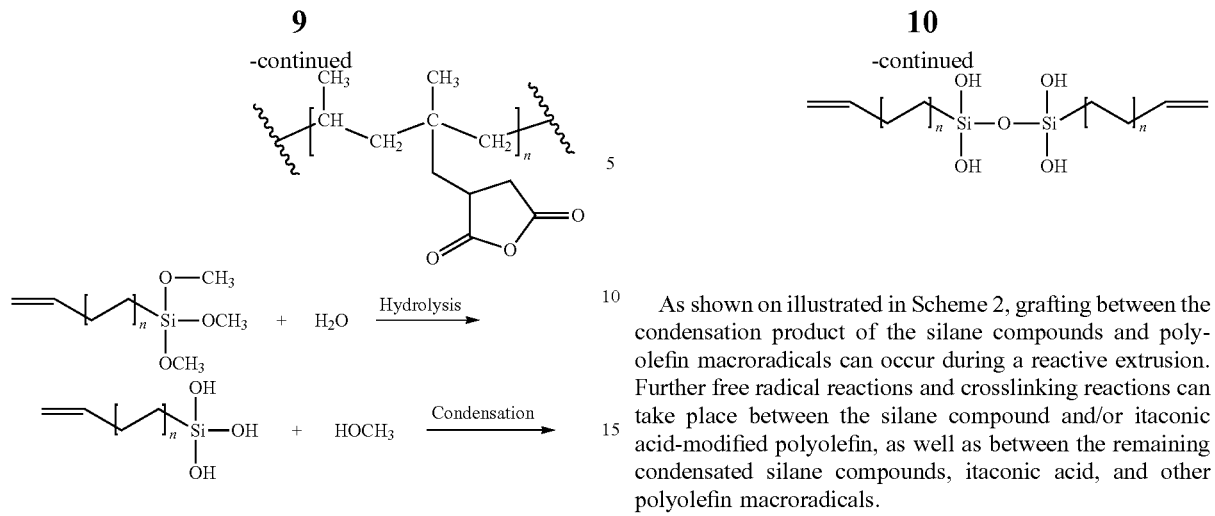

As shown on illustrated in Scheme 2, grafting between the condensation product of the silane compounds and polyolefin macroradicals can occur during a reactive extrusion. Further free radical reactions and crosslinking reactions can take place between the silane compound and/or itaconic acid-modified polyolefin, as well as between the remaining condensated silane compounds, itaconic acid, and other polyolefin macroradicals.

Scheme 2. Reaction mechanism illustrated for the grafting of the silane compound onto polyolefin and crosslinking reaction between the silane compound and polyolefin.

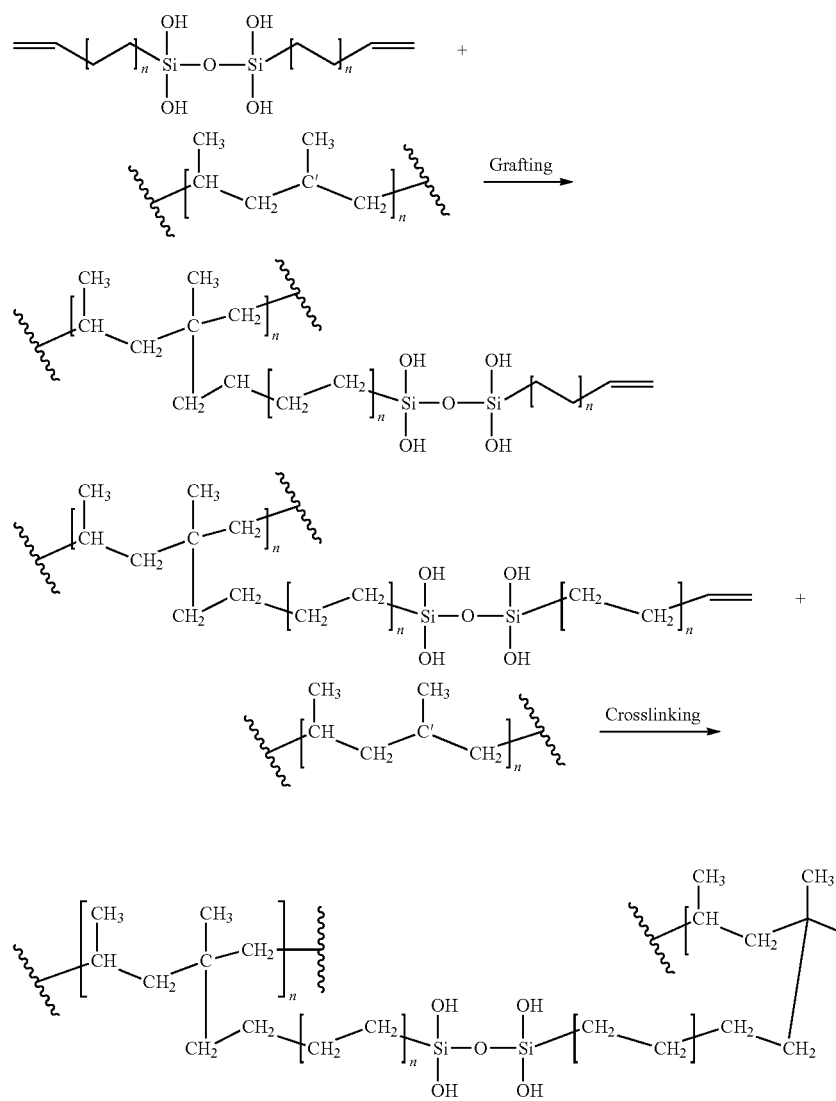

These reactions can all happen simultaneously once the free radicals form from the free radical initiator, particularly when the reactants are added in one pot.

By this one-pot process, the polyolefin is grafted with hydrolyzable silane groups, and at the same time, is also grafted with the ethylenically unsaturated polycarboxylic acid, thereby incorporating both branch structures and polar groups into the polyolefins. This process is able to proceed without going through multiple complicated processing steps and conditions, and without lengthy separation and purification of the intermediates, both of which are typical for a multiple-step process.

The reaction temperature of the one-pot process can vary widely. Suitable reaction temperatures should be at least higher than the decomposition temperature of the free radical initiator. The reaction temperature typically ranges from 60 to 300° C., for instance, from 100 to 280° C., from 190 to 230° C.

One skilled in the art understands that a polyolefin or mixtures thereof typically melts over a temperature range rather than sharply at one temperature. Thus, it may be sufficient that the polyolefin be in a partially molten state. The melting or softening temperature ranges can be approximated from the differential scanning calorimeter (DSC) curve of the polyolefin or mixtures thereof.

The particular kinetics of the one-pot process depend upon the molecular structure of the polyolefin, the siliane compounds, and ethylenically unsaturated polycarboxylic acid; the processing conditions (the temperature of the reaction system, the type of reaction vessels, and residence times, etc.), and other variables appreciated by one skilled in the art.

The components (a)-(e) of the process can be admixed, or otherwise combined, under conditions which allow for sufficient mixing before or during the reaction. Admixing of reactants can be accomplished by any means known to one skilled in the art. During the admixing/combining, it is desirable to have as homogeneous a distribution as possible, to achieve solubility of the power or or granule reactants in the liquid reactants or polyolefin melt, and to avoid uneven amounts of localized reactions. As discussed in the embodiments above, silica can be used as additive to aid the mixing of the reactants. The resulting admixture can be subjected to one or more heating steps to initiate the reaction.

For example, the one-pot process can occur by subjecting all reaction components (including component (a)-(d), and optionally component (e)) to a melt process to blend the reaction components and achieve the reactions. The term "melt processing" is used to mean any process in which polymers, such as the polyolefin, are melted. Melt processing includes extrusion, pelletization, film blowing or casting, thermoforming, compounding in polymer melt form, fiber spinning, or other melt processes.

Any equipment suitable for a melt processing can be used as long as it provides sufficient mixing and temperature control. For instance, a continuous polymer processing system such as an extruder, a static polymer mixing device such as a Brabender blender, or a semi-continuous polymer processing system, such as a BANBURY mixer, can be used. The term "extruder" takes on its broadest meaning and, includes any machine for polyolefin extrusion. For instance, the term includes machines that can extrude polyolefin in the form of powder or pellets, sheets, fibers, or other desired shapes and/or profiles. Generally, an extruder operates by feeding material through the feed throat (an opening near the rear of the barrel) which comes into contact with one or more screws. The rotating screw(s) forces the polyolefin forward into one or more heated barrels (e.g., there may be one screw per barrel). In many processes, a heating profile can be set for the barrel in which three or more independent proportional-integral-derivative controller (PID)-controlled heater zones can gradually increase the temperature of the barrel from the rear (where the plastic enters) to the front.

As discussed above, the one-pot process can take place in a single-vessel, i.e., the mixing of the reaction components takes place in the same vessel that heats the mixture to the decomposition temperature of the free radical initiator. The vessel can be, for instance, a single-screw or a twin-screw extruder, or a batch mixer. Further descriptions about extruders and processes for extrusion can be found in U.S. Pat. Nos. 4,814,135; 4,857,600; 5,076,988; and 5,153,382; all of which are incorporated herein by reference.

When a melt extrusion is used, the reaction can take place during the melt extrusion step. The heat produced during the extrusion step provides the energy necessary for the reactions between different reaction components. A temperature at or above the decomposition temperature of the free radical initiator may be maintained for a time sufficient to result in decomposition of the free radical initiator. For instance, the residence time may be at least 5 seconds, at least 10 seconds, or at least 15 seconds. Typically, the reaction time is 15-90 seconds.

Improved incorporation of the siliane compounds and ethylenically unsaturated polycarboxylic acid into polyolefin can be achieved by blending a solution or fluid form of the the siliane compounds, free radical initiator, and/or ethylenically unsaturated polycarboxylic acid into the polyolefin phase, in a manner that allows the polyolefin to absorb at least some of these reaction components.

The reaction components may be blended with one or more solvents. Suitable solvents are those miscible with the various reaction components in this reaction. The solvents used can be polar solvents such as acetone, THF (tetrahydrofuran), or chlorinated hydrocarbons such as methylene chloride; or non-polar compounds such as mineral oils, toluene, hexane, heptane, cyclohexane, benzene, and other hydrocarbons to disperse the these reaction components in a polyolefin. If there is solvent in the reactant components, the solvent can be evaporated and the resulting mixture extruded.

Alternatively, the one-pot process can take place under solventless reaction conditions. In this case, all reactions can be carried out in a bulk phase, which avoids later steps of removing the solvent or other medium.

Alternatively, the free radical initiator and/or other reaction components can be added to the post-reactor area of a polymer processing plant. Advantageously, this avoids the extra step of re-extrusion and the cost associated with it and to ensure that the free radical initiator and/or other reaction components are well blended into the polyolefin. For instance, after a slurry process of producing polyethylene, the free radical initiator and/or other reaction components can be added in powder or liquid form to the powdered polyethylene after the solvent is removed by decantation and prior to the drying and densification extrusion process. In an alternative embodiment, when a polyolefin is prepared in a gas phase process, the free radical initiator and/or other reaction components can be added in powder or liquid form to the powdered polyolefin before the densification extrusion. In another alternative embodiment, when a polyolefin is made in a solution process, the other reaction components can be added to the polyolefin solution prior to the densification extrusion process.

Blend Composition

Another aspect of the invention relates to a blend composition comprising at least two components. The first component comprises: (a) a polyolefin, (b) one or more silane compounds having the formula R"SiR$_n$R'$_{(3-n)}$ (I); and (c) an ethylenically unsaturated polycarboxylic acid. In formula (I), R" is an ethylenically or acetylenically unsaturated radical; R is a hydrolyzable group selected from the group consisting of an alkoxy, acyloxy, alkylamino, and arylamino; R' is a hydrocarbyl group having 1 to 6 carbon atoms; and n is 1, 2, or 3. The second component comprises (d) a free radical initiator. Optionally, the first or second component or both components can further contain a silicon dioxide and/or an inorganic material. The first and second components may be separately packed and are readily admixable. Suitable components (a)-(e) are the same as those descriptions relating to the process as discussed in the above embodiments.

Long-Chain Branched Polymer

Another aspect of the invention relates to a long-chain branched polyolefin prepared according to the processes as discussed in the above embodiments. The long-chain branched polyolefin is formed by reacting the components (a) through (d) in a one-pot process to form a long-chain branched polyolefin. Component (a) is a polyolefin; component (b) includes one or more silane compounds having the formula R"SiR$_n$R'$_{(3-n)}$ (I), component (c) is an ethylenically unsaturated polycarboxylic acid; and component (d) is a free radical initiator. In formula (I), R" is an ethylenically or acetylenically unsaturated radical; R is a hydrolyzable group selected from the group consisting of an alkoxy, acyloxy, alkylamino, and arylamino; R' is a hydrocarbyl group having 1 to 6 carbon atoms; and n is 1, 2, or 3. Optionally, an ingornanic material may be added to the reaction components, and optionally, one or more of component (a), (b), (c), (d), and the inorganic component are mixed with silicon dioxide prior to the reaction to facilitate the process.

Suitable components (a)-(e) and inorganic material as well as suitable reaction conditions for preparing these long-chain branched polymers are the same as those descriptions relating to the process as discussed in the above embodiments. The resulting long-chain branched polymer depends upon the starting materials and reaction conditions used.

The polyolefin can contain one or more binding sites along the polyolefin chain. Accordingly, in the resulting long-chain branched polymer, ethylenically unsaturated polycarboxylic acids may be covalently bonded at one or more binding sites along the polyolefin chain, conferring polar groups as well as branches into the polyolefin. The branches can contain grafted ethylenically unsaturated polycarboxylic acids, in which the carboxylic acid groups of the have been dehydrated, forming a cyclic acid anhydride structure.

The resulting long-chain branched polymer also includes one or more silane compounds covalently bonded at one or more binding sites along the polyolefin chain, conferring polar groups as well as long-chain branches into the polyolefin. The branches contain one or more silane compounds, in which the silane compounds have been hydrolyzed and condensated.

In one embodiment, the silane compound, prior to binding to the polyolefin, has the formula R"SiR$_n$R'$_{(3-n)}$ (I), in which R" is an ethylenically or acetylenically unsaturated radical; R is a hydrolyzable group selected from the group consisting of an alkoxy, acyloxy, alkylamino, and arylamino; R' is a hydrocarbyl group having 1 to 6 carbon atoms; and n is 1-3. In the resulting long-chain branched polyolefin, the silane compounds have been hydrolyzed and condensated.

In another embodiment, in the resulting long-chain branched polymer, the ethylenically unsaturated polycarboxylic acids that are covalently bonded at one or more binding sites along the polyolefin chain can have one or more of carboxylic acid groups dehydrated during the reaction, forming a cyclic acid anhydride structure.

The melt strength of the resulting long-chain branched polymer can be advantageously increased by the modification, as discussed in the above embodiments. The melt strength of polyolefin is related to the molecular weight distribution and macromolecular structure, including the dregree of long-chain branches (LCBs) of the polymer. The degree of long chain branching can be determined from $\langle R_g^2 \rangle^{1/2}$ ($R_g$, radius of gyration) and intrinsic viscosity $[\eta]$ measured by size-exclusion chromatography (SEC) equipped with light scattering or viscosity detector, respectively. As a result of the formation of long-chain branches, the polymer becomes more compact in solution and the $R_g$ and $\eta$ values decrease by increasing the number of branches. Thus, the decreased values of $R_g$ and $\eta$ relative to the polyolefin resin would indicate the formation of long-chain branches in the polymer. In this case, the number of branch points per molecule for the resulting long-chain branched polymer should be higher than zero.

Increasing the degree of LCB is a known to enhance melt strength. Normally, the greater the degree of LCB, the higher the melt strength and the lower the melt flow rate. Rheotens is a widely used rheological method to quantitatively characterize the melt strength and extensibility of polymers. An instrument, which is called a Gottfert rheotens extensional viscometer, measures both melt strength and extensibility simultaneously by combining the capillary rheometer with a device that pulls the melt away from the capillary die at increasing strain rates and draw ratios. Drawing force (in cN) is measured by a force balance as melt stand extruded from the die is accelerated on take-away wheels. The melt strength is defined as the maximum drawing force at rupture. The velocity (in mm/s) at rupture is the extensibility.

Typically, melt strength values higher than 0.1N can be assigned to the formation of long-chain branched polypropylene, since force (F) is relative to the melt strength of the polymer. The melt strength of the resulting long-chain branched polymer can reach to at least 0.1N, at least 0.15N, at least 0.2N, at least 0.25N, at least 0.3N, at least 0.35N, or at least 0.39N.

Additionally, extensibility of the resulting long-chain branched polymer can be advantageously increased through the modification. For instance, the extensibility of the resulting long-chain branched polymer, measured by draw-down velocity, can reach to at least 150 mm/ss, at least 155 mm/ss, at least 160 mm/ss, at least 170 mm/ss, at least 175 mm/ss, at least 180 mm/ss, or at least 185 mm/ss.

The melt flow index (MFI) in the resulting long-chain branched polymer can be advantageously reduced through the modifications. A decrease in the melt flow index is good (although indirect) evidence that the modification induces more long-chain branching than it creates chain scission. For example, the MFI of the polymer can reach to less than 100 dg/min, for instance, less than 50 dg/min, less than 10 dg/min, less than 5 dg/min.

The polarity of the resulting long-chain branched polymer can also be advantageously increased through the modification. For instance, the polarity or adhesion property of the resulting long-chain branched polymer, measured by peel test using a metal surface, can reach to at least 2.5 lb, at least 5 lb, at least 7.5 lb, at least 7.7 lb, or at least 7.8 lb.

When a further step of adding an inorganic material is caned out during the reaction of component (a) through component (d), a composite containing the long-chain branched polymer and an inorganic material is thereby formed. Any inorganic material can be used. Suitable inorganic materials are the same as those descriptions relating to the process as discussed in the above embodiments. The inorganic material can contain multiple polar groups and hence have multiple binding sites. Accordingly, one or more modified polyolefin chains may be covalently bonded at one or more binding sites of the inorganic material.

Heterophasic Blend

The resulting long-chain branched polymer from the above-described processes can be further blended with a second polyolefin that is in a different phase than the long-chain branched polymer. This can result in a modified impact copolymer. In an automotive application (such as automotive parts like bumpers, body panels, dashboards, or door claddings), it is desirable to have a heterophasic blend of polymers, i.e., a polymer in a continuous phase and a polymer in a elastomeric, dispersed phase are blended. For instance, a blend of a polypropylene-based polymer (e.g., homopolymer polypropylene) and an ethylene-propylene copolymer (EPR) is a heterophasic blend, in which the polypropylene-based polymer is the continuous phase and the EPR is the dispersed phase. The polypropylene-based matrix delivers the stiffness of the material whereas the rubbery inclusions act as impact modifiers, which enables the combination to provide a balanced stiffness-impact behavior. In one embodiment, the long-chain branched polymer is prepared from polypropylene, and can be used as a continuous phase of a heterophasic polymer blend. This long-chain branched polypropylene-based polymer is further blended with a second polyolefin that is in a different phase (i.e., elastomeric, dispersed phase) such as an EPR, to prepare a modified impact copolymer.

Uses of the Long-Chain Branched Polymer

The long-chain branched polymer prepared according to the processes of the invention may be formed into useful articles by standard forming methods known in the art, e.g., by blown film extrusion, cast film extrusion, injection or blow molding, pelletizing, foaming, thermoforming, compounding in polymer melt form, or fiber spinning. For example, any technique discussed above in the embodiments describing the melt processes can be used to prepare the long-chain branched polymer, thereby forming various useful articles, depending on the type of melt processing technique used.

For instance, the long-chain branched polymer may be useful in making films, such as blown films. The technique of blown film extrusion is known to one skilled in the art in the area of production of thin plastic films.

The long-chain branched polymer may also be used in coextruded films. The formation of coextruded blown films is known to one skilled in the art. The term "coextrusion" refers to the process of extruding two or more materials through a single die with two or more orifices arranged such that the extrudates merge together into a laminar structure, for instance, before chilling or quenching.

Coextruded blown films containing the long-chain branched polymer can be formed into packaging materials, such as pouches, bags, and containers used packaging machinery, known to one skilled in the art. Pouches, bags and other containers made from this combination of materials provide excellent toughness and impact strength and furthermore provide an excellent barrier to grease and oil and light hydrocarbons such as turpentine.

The long-chain branched polymer can also be useful in fabricating molded articles and fiber articles; in fabricating foams, wire cable, and profile extrusion; in fabricating thermal insulation materials; and in automotive applications, such as automotive parts like bumpers, body panels, dashboards, or door claddings.

Additionally, the long-chain branched polymer prepared according to the process in this invention has been modified with polar groups from the silane compounds and, thus, has improved compatibility with inorganic materials. Accordingly, the long-chain branched polymer can also be useful in fabricating polyolefin-inorganic material composite, such as the composite containing the long-chain branched polymer and glass fibers, inorganic fibers, functionalized silica nanoparticles, polyhedral oligomeric silsesquioxane (POSS), functionalized carbon nanotubes, clay, and combinations thereof. The resulting composite can be used in applications such as the automotive, packaging, electronics industries.

Additionally, because the long-chain branched polymer prepared according to the process in this invention has been modified with polar groups from the silane compounds. The polymer also has improved adhesion properties. Accordingly, the long-chain branched polymer also has improved paintability.

Additional aspects, advantages and features of the invention are set forth in this specification, and in part will become apparent to those skilled in the art on examination of the following, or may be learned by practice of the invention. The inventions disclosed in this application are not limited to any particular set of or combination of aspects, advantages and features. It is contemplated that various combinations of the stated aspects, advantages and features make up the inventions disclosed in this application.

EXAMPLES

The following examples are for illustrative purposes only and are not intended to limit, in any way, the scope of the present invention.

Example 1—Materials & Procedures

Materials

Materials used in the process include:

resins: polypropylene homopolymer, with a nominal melt flow rate of 2 dg/min and 18 dg/min;

free radical initiator—peroxide: 2,5-dimethyl-2,5-di(t-butylperoxyhexane)

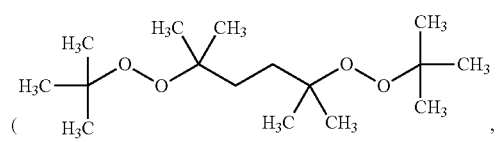 [SMILES: CC(C)(C)OOC(C)(C)CCC(C)(C)OOC(C)(C)C]

Luperox 101) in a liquid form;

process aid: fumed silica;

reactive modifiers-silane compound mixtures: (3-(trimethoxysilyl)propyl methacrylate

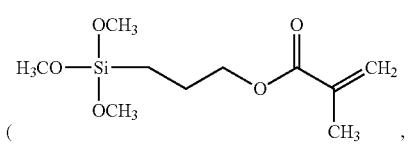

"Silane (A)") and vinyltrimethoxysilane

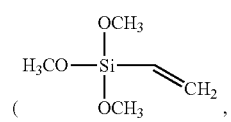

"Silane (V)") in a liquid form; and
reactive modifiers: itaconic acid

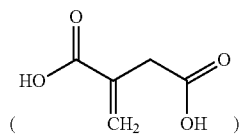

in a solid form.

Compounding—Extrusion Process

Modification was performed using a 21 mm Theyson co-rotating twin-screw extruder. Polypropylene powder and reactive modifiers were fed into main hopper of the twin-screw extruder and the peroxide was added from the side feeder. Extrusion rate of 12 lbs/hour and a screw RPM of 255 were used for all the blends. The process temperature was set to 220° C., with an actual reading of 228° C.

Sample Characterization

Techniques used to characterize the samples include differential scanning calorimetry (DSC), dynamic rheology, rheotens, fourier transform infrared spectroscopy (FTIR), nuclear magnetic resonance (NMR), gel permeation chromatography (GPC), gas chromatography (GC), melt flow, and peel test from metal surface and contact angle.

The functionalized structure of the polymer sample after the modification was characterized by FTIR and NMR. The presence of the long-chain branched structure was identified by GPC. Changes in crystallization temperatures, degree of crystallinity, molecular weight distribution, melt flow, melt strength, complex viscosity, and storage and loss modulus were monitored for modified polypropylene and compared with the unmodified and cracked polypropylene.

Characterization of melt strength of the polymer sample is useful for the high melt strength applications, and characterization of the polarity of the polymer sample is useful for compounding/composites applications. The polarity was measured by a peel test using a metal surface and contact angle as well as by studying the effects of modified polypropylene on the mechanical properties of glass fiber filled polypropylene composites.

Characterization Methods

The complex viscosity was measured at 0.1 rad/s, 190° C. by using ARES-G2 rheometer and MCR rheometer from Anton Paar GmbH. Tan δ was measured at 0.1 rad/s by using ARES-G2 rheometer and MCR rheometer from Anton Paar GmbH. The melt strength and draw-down velocity were measured by Rheo Tester 2000 equipment from Gottfert. The peel test from metal was carried out according to the ASTM D6252/D6252M standard. The flexural modulus was measured according to the ASTM D790 standard. The izod impact was measured at 23° C. according to the ASTM D256 standard. The melt flow rate (MFR) was measured according to the ASTM D1238 standard. Other parameters and properties, if not specified, were measured by standard technology and according to the standard ASTM known to one skilled in the art.

Experimental Results

The results of the characterization of various properties of polypropylene modified with itaconic acid and silane compounds are listed and compared to those of the control polypropylene that is unmodified, or modified only with itaconic acid or only with the silane compound. The results are shown in Table 1 and Table 2. In Table 3, the properties of polypropylene modified with itaconic acid and silane compounds and filled with glass fibers are listed and compared to those of the control polypropylene that is unmodified, or modified only with itaconic acid or only with the silane compound, and filled with glass fibers.

TABLE 1

Comparison of the properties between the control and modified polypropylenes (PP)

|  | Control PP | | Modified PP | | Modified PP by the one-pot process | |
|---|---|---|---|---|---|---|
|  |  |  |  |  | Modified with 0.2 wt % | Modified with 0.4 wt % |
| Properties | Based | Cracked | Modified with Itaconic Acid | Modified with Silane (A) | Itaconic Acid/ 2 wt % Silane (A) | Itaconic Acid/ 2 wt % Silane (A) |
| Melt Flow (dg/min) | 20 | 284 | 66 | 159 | 45 | 23 |
| Crystallization Temperature, Tc (° C.) | 118 | 121 | 124 | 120 | 124 | 121 |
| ΔHc (J/g) | 99 | 102 | 91 | 100 | 108 | 107 |
| Mw/Mn | 4.0 | 2.8 | 4.0 | 3.1 | 3.5 | 3.3 |
| Mw (kg/mol) | 207 | 95.5 | 154 | 114 | 137 | 147 |
| Complex Viscosity (Pa · s) at 0.1 rad/s; 190° C. | 1730 | 74.2 | 353 | 162 | 489 | 703 |
| Storage Modulus (G') at 0.1 rad/s | 12.1 | 0.05 | 16.7 | 0.1 | 7.5 | 17.7 |
| tan δ at 0.1 rad/s | 14.2 | 136 | 1.9 | 136 | 6.4 | 3.8 |

TABLE 1-continued

Comparison of the properties between the control and modified polypropylenes (PP)

|  | Control PP | | Modified PP | | Modified PP by the one-pot process | |
| --- | --- | --- | --- | --- | --- | --- |
|  | | | Modified with | Modified with | Modified with 0.2 wt % Itaconic Acid/ | Modified with 0.4 wt % Itaconic Acid/ |
| Properties | Based | Cracked | Itaconic Acid | Silane (A) | 2 wt % Silane (A) | 2 wt % Silane (A) |
| Melt Strength (N) | 0.008 | 0.0 | 0.0 | 0.0 | 0.15 | 0.17 |
| Draw-down velocity (mm/ss) | 106 | 0.0 | 0.0 | 0.0 | 186 | 175 |
| Peel Test from Metal (lb) | 0 | 0 | 2.7 | 7.7 | >7.8 | >7.8 |

TABLE 2

Comparison of the the properties between the control and modified polypropylenes (PP)

|  | Control PP | | Modified PP | |
| --- | --- | --- | --- | --- |
|  | | | Modified with 1.5 wt % Itaconic Acid/ 0.5 wt % Silane (A) | Modified with 1.5 wt % Itaconic Acid/ 1 wt % Silane(V)/ 1 wt % Silane(A) |
|  | Based | Cracked | | |
| Melt Flow (dg/min) | 2.3 | 136 | 9.5 | 0.5 |
| Crystallization Temperature, Tc (° C.) | 119 | 122 | 123 | 124 |
| ΔHc (J/g) | 106 | 106 | 104 | 111 |
| Mw/Mn | 4.5 | 2.5 | 3.6 | |
| Mw (kg/mol) | 320 | 121 | 180 | High Mw |
| Complex Viscosity (Pa · s) at 0.1 rad/s; 190° C. | 12800 | 173 | 2470 | 14000 |
| Storage Modulus (G') at 0.1 rad/s | 286 | 0.03 | 125 | 1150 |
| tan δ at 0.1 rad/s | 4.4 | 572 | 1.4 | 0.7 |
| Melt Strength (N) | 0.075 | 0.0 | 0.25 | 0.39 |
| Draw-down velocity (mm/ss) | 120 | 0.0 | 177 | 153 |

TABLE 3

Effects of modified polypropylenes (PP) on the mechanical properties of glass fiber (GF) filled with polypropylene composites

| Sample Names | MFI (dg/min) | Flexural Modulus (MPa) | Izod @ 23° C. (J/m) |
| --- | --- | --- | --- |
| Control sample - PP + 30 wt % GF | 4.5 | 6188 | 67.6 |
| PP + 1 wt % Dynasylan ® 1189 + 30 wt % GF | 3.7 | 6232 | 58.5 |
| PP + 2 wt % Silane (A) + 30 wt % GF | 5.8 | 4591 | 64.8 |
| PP + 2 wt % PP modified with 0.2 wt. % Itaconic Acid/2 wt % Silane (A) + 30 wt % GF | 3.8 | 6309 | 82.1 |
| PP + 2 wt % PP modified with 0.4 wt. % Itaconic Acid/2 wt % Silane (A) + 30 wt % GF | 4.2 | 6302 | 83.9 |

Dynasylan ® 1189 is a bifunctional silane possessing a reactive secondary amine and hydrolyzable methoxysilyl groups-N-(n-Butyl)-3-aminopropyltrimethoxysilane The experimental data in Tables 1-3 above show that this novel approach has the capability to produce new grades of polypropylene with broadening molecular weight, and formation of long-chain branches characterized by melt flow, GPC, decreased intrisinc viscosity, and improved melt strength and polarity.

As shown in Table 1, the melt strength of the modified polypropylenes prepared by the one-pot process (i.e., PP modified with 0.2 wt % itaconic acid/2 wt % silane (A) and with 0.4 wt % itaconic acid/2 wt % silane (A) is much higher than the melt strength of the control polypropylenes and the polypropylenes modified with only itaconic acid and with only silane (A). Similarly, in Table 2, the melt strength of the modified polypropylenes prepared by the one-pot process (i.e., PP modified with 1.5 wt % itaconic acid/0.5 wt % silane (A) and with 1.5 wt % itaconic acid/1 wt % silane (V)/1 wt % silane (A)) is much higher than the melt strength of the control polypropylenes.

Figure 2:
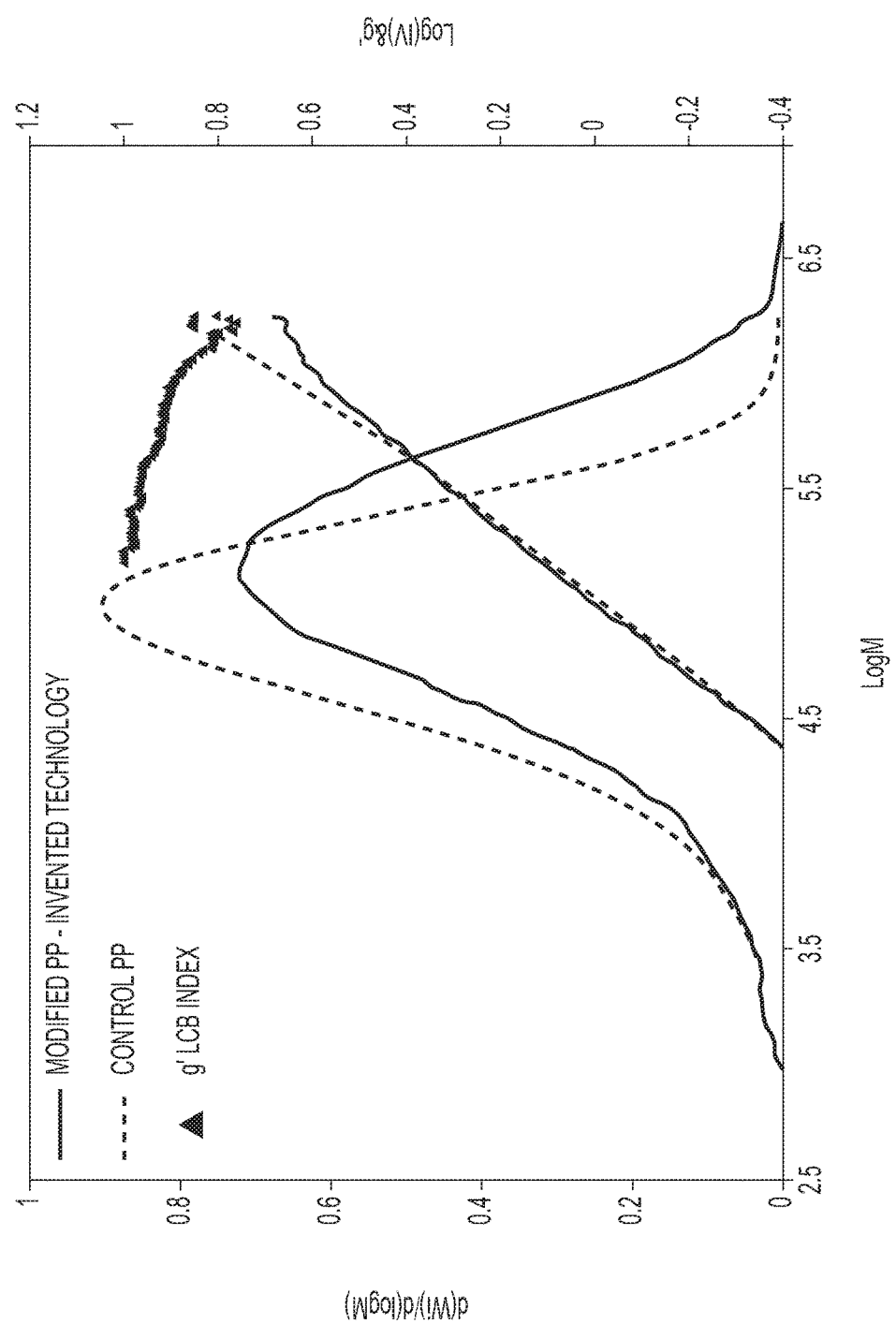
FIG. 2 shows intrinsic viscosity (IV) as a function of the molecular mass of characterized by gel permeation chromatography (GPC) elution fractions for the polypropylene modified with the silane compound and itaconic acid, compared to the controlled polypropylene with no modification.

Also, as shown in Table 3, the mechanical properties, Flex and Izod, as characterized by tensile test of glass fiber (GF) filled composites prepared with modified polypropylenes (prepared by the one-pot process, i.e., PP modified with 0.2 wt % itaconic acid/2 wt % silane (A) and with 0.4 wt % itaconic acid/2 wt % silane (A)) and mechanical properties of the glass fiber (GF) filled composites prepared with polypropylenes modified with only silane (A). Improvments in the mechanical properties shows that itaconic acid/silane modified PP product improves interaction of the glass fibers with the polymer matrix due to the improved polarity and acts as a compartibilizer between non-polar polymer matrix and polar glass fiber surfaces FIG. 2 shows intrinsic viscosity (IV) as a function the molecular mass of GPC elution fractions for linear and modified PP. The viscosity technique in combination with GPC was used for determining the degree of long chain branching in modified PP. Long chain branched polymer chains in solution typically are more dense and have lower intrinsic viscosity than linear chains of the same molecular weight. This is expressed through the contraction factor g', as shown in the following equation (1):

$$g' = \frac{[\eta]_{br}}{[\eta]_{lin}} \quad (1)$$

The lower intrinsic viscosity for modified PP is a reflection of the degree of long chain branching which was calculated using equation (1), namely by the ratio of the intrinsic viscosities (IV) of branched (modified) and linear (control) polymer. As seen in FIG. 2, g', a contraction factor of modified PP, deviates from the linear control PP (i.e., 1) in the 1 to 0.8 range. This observation strongly indicates that modified polypropylenes prepared by the one-pot process has the long chain branched structure in the high molecular weight region. Moreover, as a result of the claimed modification process, the modified polypropylenes prepared by the one-pot process also shows distinct broadening of molecular weight distribution and increase content of high molecular weight fractions which was absent from the original linear sample (control).

Although preferred embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

What is claimed is:

1. A process for forming a long-chain branched polyolefin, comprising reacting:
   (a) a polyolefin;
   (b) one or more silane compounds having the formula R"SiR$_n$R'$_{(3-n)}$, wherein:
      R" is an ethylenically or acetylenically unsaturated radical,
      R is a hydrolyzable group selected from the group consisting of an alkoxy, acyloxy, alkylamino, and arylamino,
      R' is a hydrocarbyl group having 1 to 6 carbon atoms, and
      n is 1-3;
   (c) an ethylenically unsaturated polycarboxylic acid; and
   (d) a free radical initiator,
   in a one-pot process to form a long-chain branched polyolefin,
   wherein the reacting step includes subjecting components (a)-(d) to a melt processing at a temperature to at least partially melt the polyolefin, and
   wherein reacting components (a)-(d) in a one-pot process dehydrates the carboxylic acid groups of the ethylenically unsaturated polycarboxylic acids to produce water, which is used to hydrolyze one or more of said silane compounds.

2. The process of claim 1, further comprising mixing one or more component (a), (b), (c), and (d) with silicon dioxide, prior to the reacting step.

3. The process of claim 1, wherein the polyolefin is a polymer or copolymer of one or more olefins having from 2 to 12 carbons.

4. The process of claim 3, wherein the one or more olefins are selected from the group consisting of ethylene, propylene, 1-butene, 2-butene, 1-pentene, 3-methyl-1-butene, 1-hexene, 4-methyl-1-pentene, 3-methyl-1-pentene, 4, 6-dimethyl-1-heptene, 1-octene, 1-decene, 1-undecene, 1-dodecene, 1-tetradecene, 1-hexadecene, 1-octadecene, and 1-eicocene, and combinations thereof.

5. The process of claim 3, wherein the polyolefin is polyethylene, polypropylene, a copolymer thereof, or polymer blends containing polyethylene and/or polypropylene.

6. The process of claim 5, wherein the polyolefin is a polymer blend containing ethylene propylene rubber (EPR).

7. The process of claim 1, wherein the free radical initiator is a peroxide.

8. The process of claim 7, wherein the peroxide is selected from the group consisting of a diacyl peroxide, a peroxyester, a peroxyketal, a dialkyl peroxide, an organic peroxycarbonate or organic peroxydicarbonate, and combinations thereof.

9. The process of claim 8, wherein the peroxide is selected from the group consisting of benzoyl peroxide, dimyristoyl peroxide, tert-butylperoxy benzoate, tert-butylperoxy acetate, O,O-tert-butyl-O-(2-ethylhexyl)monoperoxy carbonate, n-butyl-4,4-di-(tert-butyl peroxy)valerate, 1,1-bis (tertbutylperoxy)cyclohexane, 1,1-bis (tert-butylperoxy)-3,3,5-trimethylcyclohexane, 2,2-bis(tert-butylperoxy)butane, dicumylperoxide, tert-butylcumylperoxide, di-(2-tert-butylperoxy-isopropyl-(2))benzene, di-tert-butylperoxide (DTBP), 2,5-dimethyl-2,5-di(tert-butylperoxy)hexane, 2,5-dimethyl-2,5-di(tert-butylperoxy)hexyne, 3,3,5,7,7-pentamethyl 1,2,4-trioxepane, dimyristyl peroxydicarbonate, dicetyl peroxydicarbonate, tert-butylperoxy 2-ethylhexyl carbonate, di(2-ethylhexyl) peroxydicarbonate, tert-butylperoxy isopropyl carbonate and combinations thereof.

10. The process of claim 1, wherein the ethylenically unsaturated polycarboxylic acid is selected from the group consisting of itaconic acid, maleic acid, fumaric acid, citraconic acid, and mesaconic acid.

11. The process of claim 10, wherein the ethylenically unsaturated polycarboxylic acid is itaconic acid.

12. The process of claim 1, wherein:
R" is an ethylenically unsaturated radical having the formula

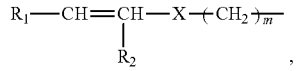

wherein $R_1$ and $R_2$ each are independently H or $C_1$-$C_6$ alkyl, or, alternatively, $R_1$ and $R_2$ together form a cyclic hydrocarbyl; X is absent, —C(=O)—O—, or —C(=O)—NH—; and m is 0-6.

13. The process of claim 12, wherein R" is selected from the group consisting of vinyl, allyl, isopropenyl, butenyl, cyclohexanyl, acryloxymethyl, acryloxypropyl, (meth)acryloxy methyl, (meth)acryloxy propyl, and styryl.

14. The process of claim 1, wherein R is methoxy, ethoxy, formyloxy, acetoxy, or propionyloxy; and R', if present, is methyl, ethyl, propyl, decyl, or phenyl.

15. The process of claim 14, wherein R is a methoxy or ethoxy.

16. The process of claim 1, wherein n is 3.

17. The process of claim 1, wherein the silane compound is vinyltrimethoxysilane, vinyl triethoxysilane, 3-(trimethoxysilyl)propyl methacrylate, 3-(triethoxysilyl) propyl methacrylate, trimethoxysilyl propyl acrylate, trimethoxysilyl methyl acrylate, 3-[dimethoxy(methyl)silyl] propyl acrylate, 3-[methoxy(dimethyl)silyl]propyl acrylate, methoxy(dimethyl)silyl]methyl acrylate, vinyl triacetoxysilane, p-styryltrimethoxysilane or combinations thereof.

18. The process of claim 17, wherein the silane compound is 3-(trimethoxysilyl)propyl methacrylate, vinyltrimethoxysilane, or combination thereof.

19. The process of claim 1, wherein:
the polyolefin (a) is polypropylene homopolymer,
the silane compound (b) is an mixture of

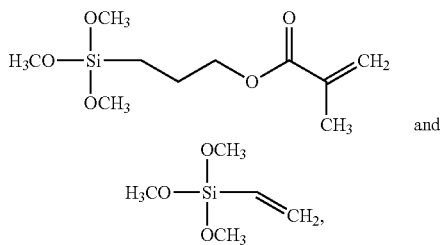

the ethylenically unsaturated polycarboxylic acid (c) is

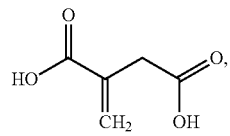

and
the free radical initiator (d) is

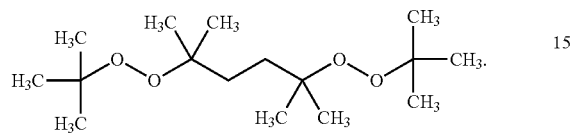

20. The process of claim 1, wherein the reacting step further involves:
  covalently bonding one or more ethylenically unsaturated polycarboxylic acids at one or more binding sites along the polyolefin chain,
  condensating the hydrolyzed one or more silane compounds, and
  covalently bonding one or more condensed silane compounds at one or more binding sites along the polyolefin chain.

* * * * *